Sept. 21, 1926.  
O. LINK  
1,600,479
PROTECTOR FOR THE WIRING SYSTEMS OF MOTOR CARS
Filed Nov. 30, 1923
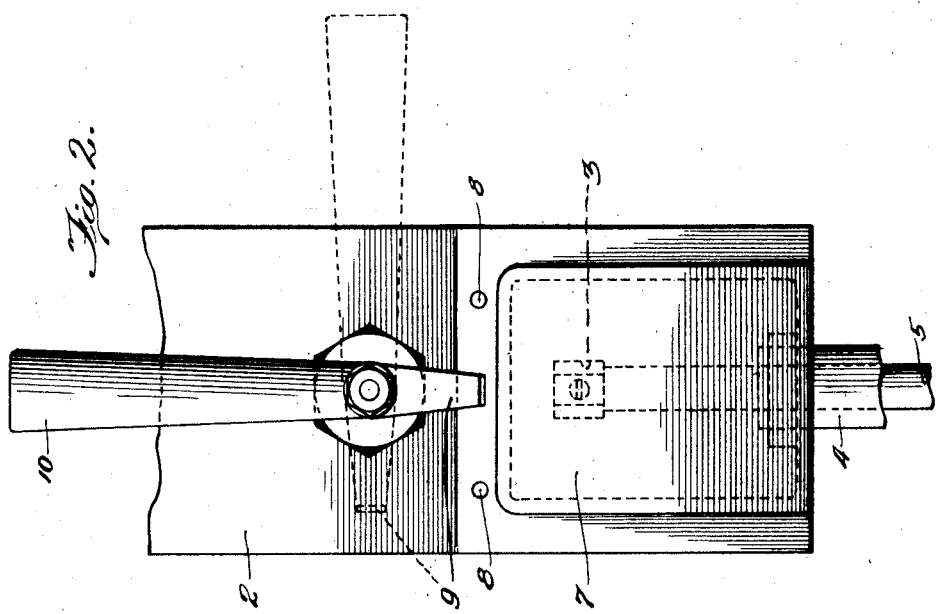
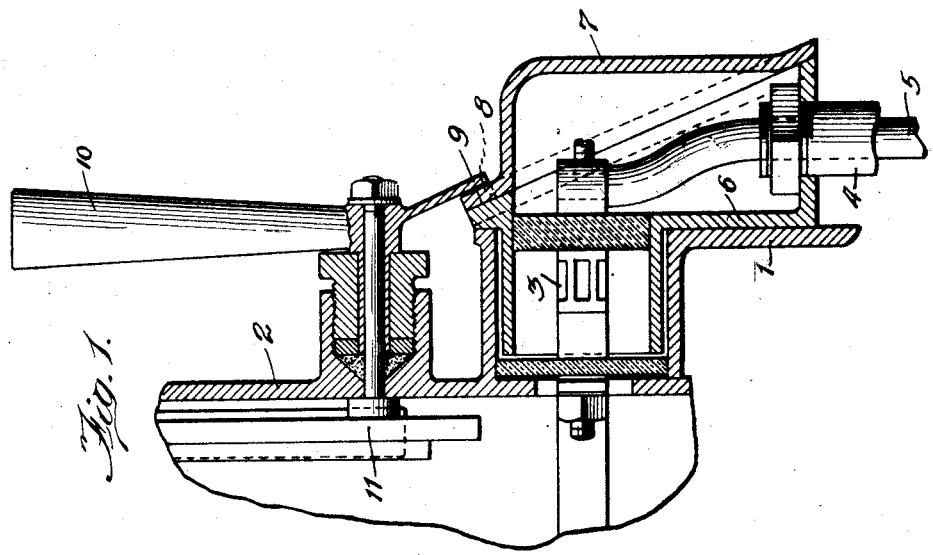
Inventor.
O. Link
By H.J. Sanders
Atty.

Patented Sept. 21, 1926.

1,600,470

UNITED STATES PATENT OFFICE.

OTTO LINK, OF GARDNERVILLE, NEVADA.

PROTECTOR FOR THE WIRING SYSTEMS OF MOTOR CARS.

Application filed November 30, 1923. Serial No. 677,911.

This invention relates to improvements in protectors for the wiring systems of motor cars whereby the possibility of electric sparks is prevented while the system is being inspected or repaired, or at other times. With the foregoing and other objects in view the invention consists in the combination and arrangement of parts to be hereinafter fully described, pointed out in the appended claim and illustrated in the accompanying drawing which forms a part of this application and in which—

Fig. 1 is a fragmentary sectional view of a motor casing and automobile chassis showing a portion of the wiring system and the application of my invention.

Fig. 2 is a top plan view of Fig. 1 with two positions of the control lever illustrated.

Like reference characters denote corresponding parts in both views.

This invention is adapted particularly for use on heavy duty motor trucks, farm tractors and the like, and on vehicles where ordinarily the fire hazard is present. More specifically it comprises a cover for the box or casing for the wiring system, and manually controlled means for preventing the removal of this cover until the motor is stopped and the circuit open, thus effectually preventing sparks emanating from the live parts during inspection, repair, etc.

The reference numeral 1 denotes the vehicle chassis, 2 the motor casing, 3 a lead of the wiring system, and 4 a conduit pipe for a wire 5. To the wiring or service box 6 I removably secure the cover 7 by the snaps or pins 8, or otherwise, said cover being normally retained positively against removal by the finger 9 integral with the switch lever 10 that controls a switch 11 to the motor.

In Fig. 2 the lever 10 is shown in "on" position in full lines and in "off" position in dotted lines. In full line position the cover 7 is positively retained against removal and to permit its removal the switch must first be disposed in "off" position thereby stopping the motor and opening the electric circuit.

What is claimed is:—

The combination with an ignition circuit control switch having a handle pivoted at one end provided with an integral finger extending from the pivoted end thereof; of a service box for wiring leads of the circuit disposed adjacent said switch, a detachable and removable cover secured over said service box, and a lug on said cover extending in the direction of said switch at an incline for engagement under said handle finger when the switch is in circuit closing position to retain said cover against removal.

In testimony that I claim the foregoing as my own I have hereto affixed my signature.

OTTO LINK.